United States Patent [19]

Baader

[11] 3,873,968
[45] Mar. 25, 1975

[54] VEHICLE LIGHT WARNING SYSTEMS
[76] Inventor: Joseph E. Baader, 333 Holiday Dr., Springfield, Ohio 45505
[22] Filed: Nov. 9, 1973
[21] Appl. No.: 414,472

Related U.S. Application Data
[63] Continuation-in-part of Ser. No. 228,531, Feb. 23, 1972, abandoned.

[52] U.S. Cl. .................................................. 340/72
[51] Int. Cl. ........................... B60q 1/38, B60q 1/46
[58] Field of Search ............ 340/74, 83, 72; 315/77

[56] References Cited
UNITED STATES PATENTS
3,182,289  5/1965  Rossi .................................... 340/83
3,372,373  3/1968  Heidman .............................. 340/74
3,444,513  5/1969  Kratochvil ............................ 340/83

Primary Examiner—Donald J. Yusko
Attorney, Agent, or Firm—David H. Semmes

[57] ABSTRACT

Vehicle light warning systems, especially for school buses, operating an eight lamp system of four red and four amber lights, two each in front and rear, to indicate initially a slowing down of the vehicle by activating flashing of the amber lights and subsequently, upon door opening, inactivating the amber lights and activating flashing of the red lights to indicate a vehicle stop. Upon door closing all lights are inactivated.

9 Claims, 4 Drawing Figures

VEHICLE LIGHT WARNING SYSTEMS

CROSS REFERENCE TO RELATED APPLICATION

This application is a continuation-in-part of my copending application Ser. No. 228,531, filed Feb. 23, 1972, entitled Vehicle Light Warning System, now abandoned.

BACKGROUND OF THE INVENTION

Warning light systems as applied to school buses or the like are subject to state regulation and while the number of lights, their location and timing sequence of flashing illumination are regulated by state authorities, basically such systems require eight lamps including four red and four amber, two each in front and rear, with the amber lights being activated during slowing down of the bus and when the bus has stopped the amber lights are deactivated and the red lights activated. The red lights must be flashingly operated during the period when the bus is stopped and, with the door open, passengers are entering or discharging from the bus. Subsequent to closing of the bus door and prior to moving of the bus, all lights must be inactive. In another form the red lights operate only after the amber lights.

Heretofore such systems have not been entirely satisfactory in that complex wiring and operating conditions were incorporated and elements of vehicle operator error or forgetfulness were possible.

The present invention provides systems overcoming these drawbacks.

SUMMARY OF THE INVENTION

The invention primarily is for a school bus flasher light circuit in which plural amber lights are activated to flash on and off as the school bus slows and then, as the school bus stops and the door is opened, red lamps, front and rear, flash on and off. Flashing of the amber lights is initially activated by a single return spring biased manual lever upon slowing of the vehicle and flashing of the amber warning lights continues through a relay activation until the vehicle stops and the door is opened which serves to deactivate the amber lights and initiate flashing actuation of the red lights, also by relay. all lights are then subsequently deactivated when the door is closed and movement of the vehicle resumed. Essentially the systems consist of a dual flasher, a single pole single throw grounded relay, a single pole double throw relay with isolated coil, a spring return momentary "on" switch and a door switch.

Additional objects and advantages of the invention will be more readily apparent from the following detailed description of an embodiment thereof when taken together with the accompanying drawings in which.

Referring now in greater detail to the drawings, the systems, as required for school buses, employ a set of eight warning lights which are physically positioned in sets of four on the front and rear of the bus, each end of the bus having two amber and two red lights. The systems are operated on the normal twelve volt DC electrical system.

Figure 1:
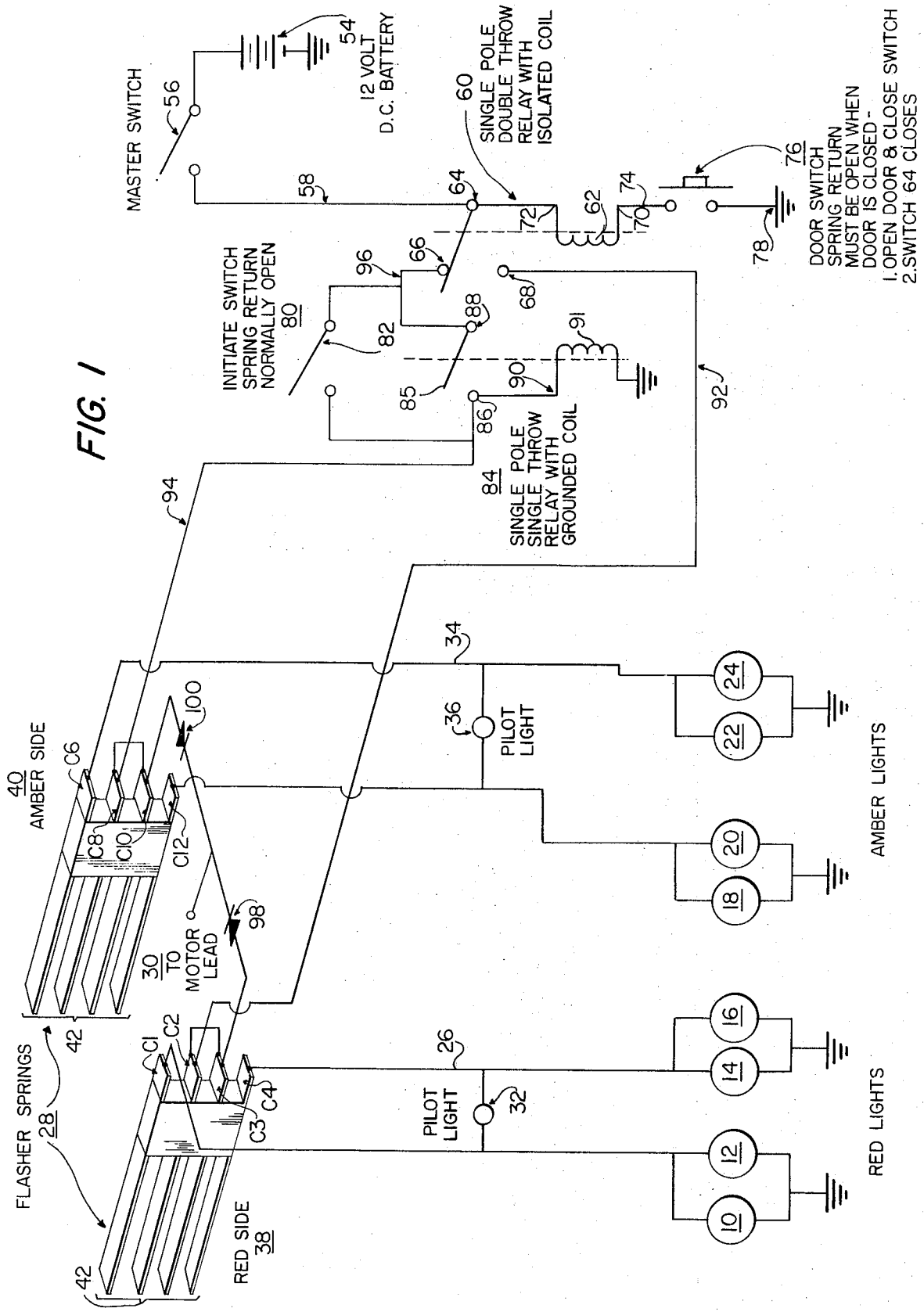
FIG. 1 is a schematic diagram of a circuit in accordance with one form of the invention.

In the simplified schematic shown in FIG. 1 of the drawings the red lights are designated at 10, 12, 14 and 16 and the amber lights at 18, 20, 22 and 24. It is understood that two of the red lights and two of the amber lights are physically positioned both at the rear and front of the vehicle. The red lights are operatively connected through wiring 26 to a dual flasher unit generally designated 28 which is motor actuated by motor 30, both of which will be described in greater detail hereinafter, and a pilot light 32 is included in the circuit to indicate operation. The amber lights are also connected to dual flasher 28 by wiring 34 and the circuit includes operating pilot light 36.

Figure 4:
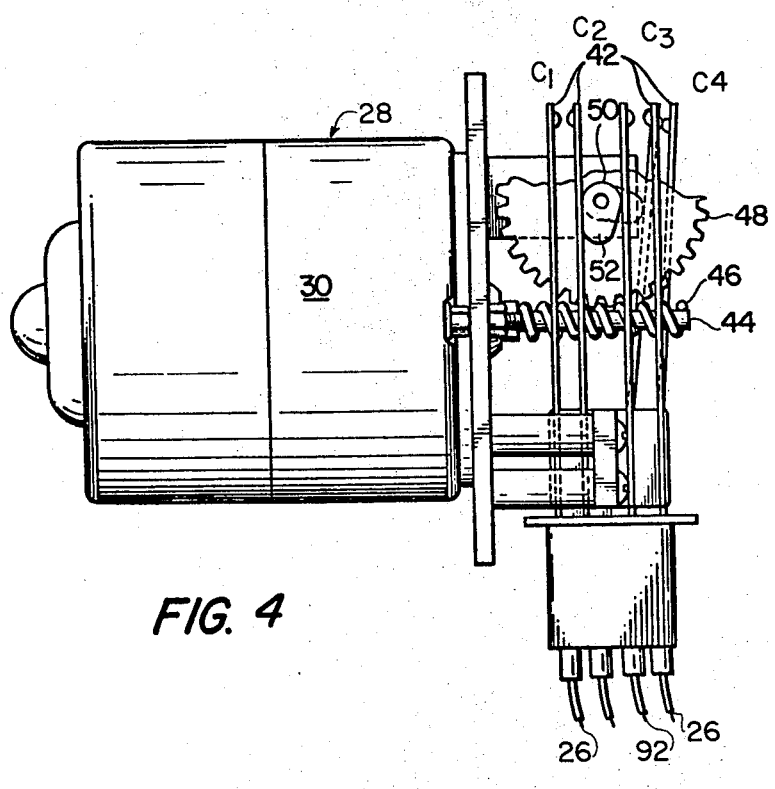
FIG. 4 is an end perspective view of the dual flasher of FIG. 3.

The dual flasher, as schematically shown in FIG. 1, includes a red side 38 and an amber side 40 for actuating the red and amber lights in a flashing mode of operation respectively. The red side includes a plurality of contacts C1, C2, C3 and C4 and amber side 40 includes a plurality of contacts C6, C8, C10 and C12. Contacts C2, C3 and contacts C8, C10 are interconnected as shown in FIG. 1. These contacts are carried, respectively, on spring fingers 42 and the contacts are respectively operable by means of motor 30 which has a solid state field and the output shaft 44 of the motor has a worm gear 46 operatively drivingly engaging a toothed wheel 48 which in turn serves to rotate opposed arms 50 having cams 52 thereon in the nature of lobes or projections interleaved between spring fingers 42. Upon operation of the motor the cams selectively interengage various of the contacts which is permitted through bending of the spring fingers by the cams as schematically shown in FIG. 4.

The system is connected to the vehicle electrical system including the usual 12 volt battery 54 with the circuit including a master cutoff switch 56 and fuse coil connected by wire 58 to a single pole, double throw relay 60 with isolated coil as at 62. This relay includes a rotor 64 and contacts 66 and 68. The relay is connected by a single lead or wire 74 through a plunger type, momentary on, door switch 76 which is grounded as at 78 to the vehicle.

As spring return momentary on switch 80 having an operating lever 82 is provided and operatively interconnected to a single pole, single throw grounded relay 84 through contactor 85 and connectors 86 and 88. Connector 86 is connected through connector 90 to relay 84 which through coil 91 is grounded as shown.

Red side 38 is connected by lead 92 to relay 60 as shown and amber side 40 is connected through lead 94 to relay 84 which in turn is connected through lead 96 to relay 60.

In operation, when the enter and exit door is closed, the door switch 76 is in the off position which allows relay 60 to be in relaxed position. Current is applied through rotor 64 to contact 66 of the relay and on to contact 88 of relay 84. When momentary switch 80 is closed, current is applied to contact 86 of relay 84 which energizes the coil of relay 84 and the amber side of the dual motor driven flasher. Current then flows from contact 88 of relay 84 to contact 90 which holds the coil in the energized position as switch 80 returns to off position. The flasher actuated switch means 38, 40 operate to close or complete a circuit from battery 54 through the leads 92 or 94. The contacts 42 are actuated mechanically by the cam means operatively driven by motor 30.

The amber mode of operation is as follows:

When door of bus is opened door switch 76 is closed allowing current to flow through coil of the relay 60 energizing same. In relay 60, rotor 64 moves from contact 66 to contact 68 which supplies current to the red light side of dual motor driven flasher through lead 92.

Since current is no longer applied to relay 84 from contact 66 of relay 60 the amber lights are turned off. The amber lights cannot be operated, whenever the red lights are operating, because relay 60 is in energized position. The red lights operate as long as the door is in open position.

When the door is closed the door switch 76 contacts are opened, and open the circuit of relay coil 60 allowing the relay to return to its relaxed position. Current to the red lamps is interrupted and the circuit returns to the original state with both relays in relaxed position with no lights operating.

Once the amber lights are energized by use of switch 80 they remain on until the door is opened which energizes relay 60 disconnecting current to the amber light circuit.

The relay 60 energizes whenever the door is opened (the door switch 76 being thereby closed), irregardless of whether or not the amber light circuit is used. While the door is opened (the red lights in operation) the amber lights cannot be energized.

Since one motor is used in the motor driven flasher for both the amber and red lights it would be possible to have current feed to the other set of lights. This effect is negated by using two diodes 98, 100 in the motor circuit. When the amber lights are given power, current flows through diode 100 to the motor but diode 98 is reverse biased, not allowing current to flow to the red lights. When the red lights are given power, current flows through diode 98 to the motor and diode 100 is reverse biased and no current flows to the amber lamps. So isolation of the amber and red lamps is achieved.

Figure 3:
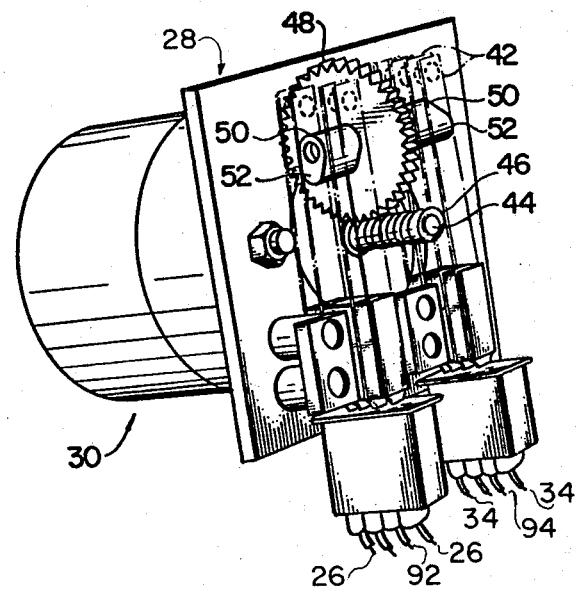
FIG. 3 is a side elevational view of a dual flasher cam operating light actuator in the system.

The details of the dual flasher 28 are shown in FIGS. 3 and 4.

Figure 2:
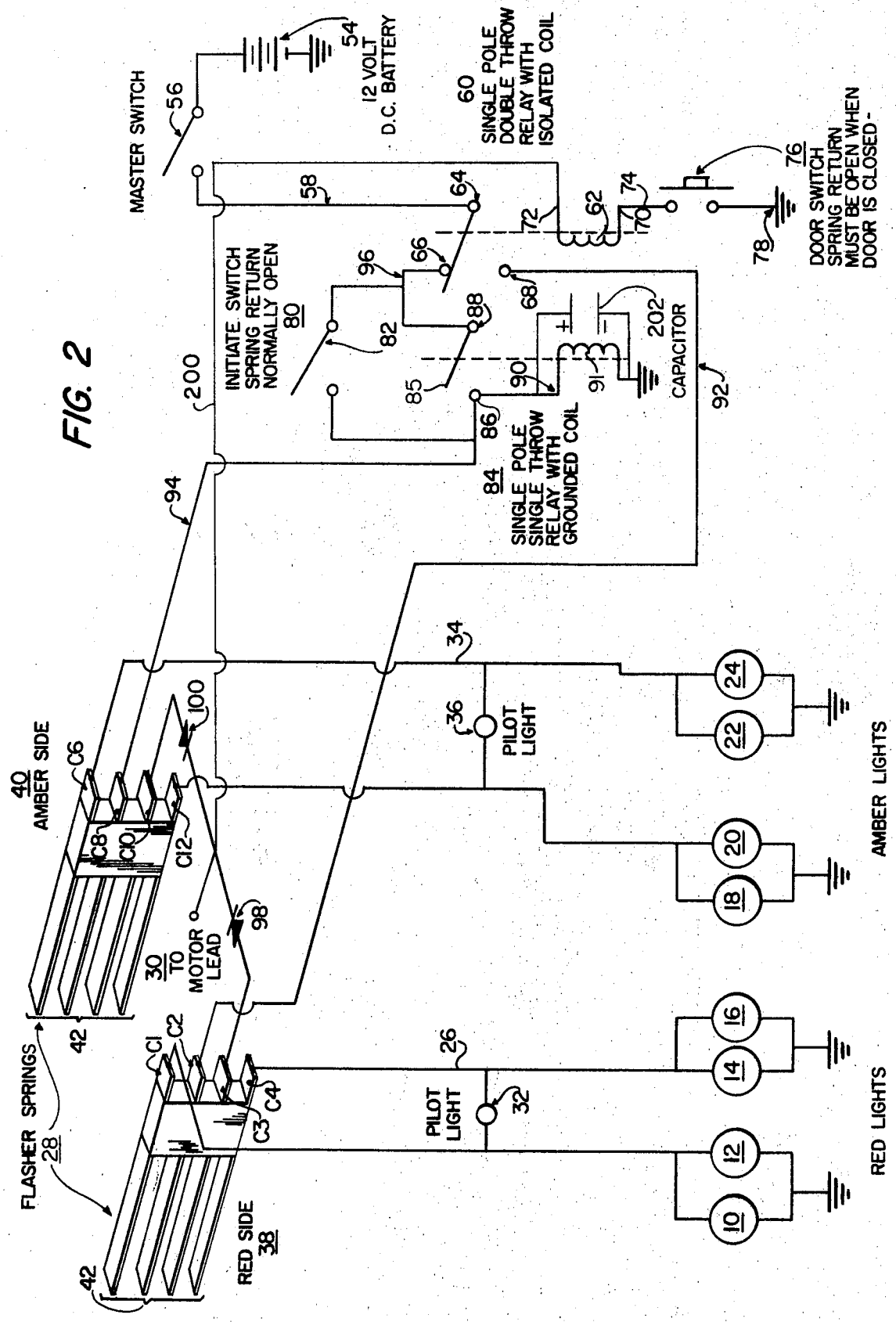
FIG. 2 is a schematic diagram of a second circuit embodiment.

FIG. 2 shows a second circuit embodiment of the invention which functions basically the same as that of FIG. 1 but, as required in some states, operates with red only after amber. In order to obtain red lights only after the amber lights have been initiated the connection between contact 72 and 64 is removed and contact 72 is connected by lead 200 to the motor circuit, i.e., to the motor lead between diodes 98 and 100. The coil of relay 60 can get power from the battery only when the motor is running, which now occurs only when the amber lights are initiated at which time the motor gets its power from relay 84. In this form the contact C2 on the red side is connected by lead 92 to contact 68, and contact C3 is connected to the motor circuit. On the amber side contact C8 is connected by lead 94 to contact 86 and contact C10 is connected to the motor circuit. A capacitor 202 is placed in parallel with the coil of relay 84 to insure that the motor will have power for the maximum amount of time while the relays are switching from amber mode to the red mode.

Operation and construction as hereinbefore described will be readily understood. Manifestly minor changes in details can be effected without departing from the spirit and scope of the invention as defined in and limited solely by the appended claims.

I claim:

1. In a vehicle light warning system for a vehicle having a door, caution indicating lights and stop indicating lights mounted on the vehicle, an electric power source, and an energizable electric circuit on the vehicle incorporating said lights for actuation thereof:

A. a dual flasher means having two sets of normally open contacts connected respectively to said caution and stop indicating lights and a rotor means operable upon rotation to intermittently and repetitively close and energize said contacts to cause flashing of said lights;
   B. a first holding relay in said circuit;
   C. a normally open spring return initiate switch operable upon closing activation to connect said first holding relay to said battery for energization and to hold said switch in closed position and thereby energize through said circuit said contacts in said flasher means connected to said caution lights;
   D. a second holding relay in said circuit between said battery and said first relay having a contact movable from a first position for energizing said first relay to a second position connecting and energizing through said circuit said contacts in said flasher means connected to said stop lights;
   E. a spring return door switch normally open when said door is closed and operable upon opening said door to so close and energize said second holding relay to move said contact thereof to connect and to operate said stop lights in direct circuit and de-energize said first relay to deactivate said caution lights;
   F. said second relay being connected in said circuit through said door switch with a single wire to a vehicle ground.

2. In a vehicle light warning system as claimed in claim 1, an electric motor connected to said rotor means, a motor circuit, said electric power source being connected to one contact of said second relay, a second contact of said second relay being connected to a lead of said motor circuit, the coil of said second relay being energized from said power source only when said motor is connected in said circuit and running whereby energization of said stop indicating lights can occur only after energization of said caution indicating lights which energizes said first relay and thereby energizes said motor circuit.

3. In a vehicle light warning system as claimed in claim 1, said sets of contacts including a plurality of spring fingers having coactable contacts thereon, said rotor means being operable for intermittently and repetitively engaging and disengaging said contacts through bending of said spring fingers to complete circuits to the respective lights in an established flashing mode of operation.

4. In a vehicle light warning system as claimed in claim 3, including a solid state field DC motor, a worm gear on the output shaft of said motor, a gear wheel operatively associated with said worm gear, opposed arms drivingly connected to said gear wheel, cam lobes on said arms, said spring fingers being in two spacedly disposed arrays, said cams being interleaved between ones of said spring fingers, said motor upon actuation rotating said cams to intermittently selectively engage and disengage the contacts on said leaf springs through bending thereof in opposite directions and releasing the same for return to noncontact position.

5. In a vehicle light warning system as claimed in claim 4, said second relay comprising a single pole double throw relay with isolated coil.

6. In a vehicle light warning system as claimed in claim 5, said second relay comprising a single pole single throw relay with grounded coil.

7. In a vehicle light warning system as claimed in claim 6, two one way current diodes in the motor circuit, said diodes being operable to selectively isolate functioning of said caution indicating lights and said stop indicating lights through reverse biasing to selectively prevent current flow to said lights.

8. In a vehicle light warning system as claimed in claim 2, a capacitor connected in parallel with the coil of said second relay and operable to insure power to said motor for a maximum time period while said relays are switching from a caution light mode to a stop light mode.

9. In a vehicle light warning system for a vehicle having a door, caution indicating lights and stop indicating lights mounted on the vehicle, an electric power source, and an energizable electric circuit on the vehicle incorporating said lights for actuation thereof:

A. a dual flasher means operatively connected in said circuit and including:
 i. a first set of electrical contacts;
 ii. a second set of electrical contacts;
 iii. said first set of contacts being connected to said caution indicating lights;
 iv. said second set of contacts being connected to said stop indicating lights;
 v. said sets of contacts including respectively a plurality of spring fingers having coactible contacts thereon,
 vi. a driven rotor including cam means operable upon rotation to intermittently and repetitively engage and disengage said contacts in said sets of contacts through bending of said spring fingers to complete circuits to the respective said lights connected thereto to cause flashing thereof in an established flashing mode of operation;

B. a first holding relay in said circuit having contacts connectable to said first set of contacts and operable to selectively separately energize said first set of contacts;

C. a second holding relay connected in said circuit between said power source and the remainder of said circuit and having a contact operable to selectively energize and de-energize said first relay;

D. a normally open momentary-on switch in said circuit portion operable upon closing to energize said first relay from said power source and close said circuit to said caution lights;

E. a spring return door switch in said circuit normally open when said door closed and operable through said second relay to close and activate the circuit to said second set of contacts when said door is opened to energize said stop lights in direct circuit and deenergize said caution lights;

F. said second relay being connected in said circuit through said door switch with a single wire to a vehicle ground.

* * * * *